United States Patent [19]

Hanna

[11] Patent Number: 4,798,217
[45] Date of Patent: Jan. 17, 1989

[54] FRONT, TOP AND REAR APPLICATOR FOR A VEHICLE WASH

[76] Inventor: Daniel C. Hanna, 1133 SW. Rivington Dr., Portland, Oreg. 97201

[21] Appl. No.: 913,957

[22] Filed: Oct. 1, 1986

[51] Int. Cl.⁴ ............................................... B60S 3/04
[52] U.S. Cl. .................................. 134/57 R; 134/123; 134/181
[58] Field of Search ............. 134/45, 57 R, 123, 180, 134/181; 15/DIG. 2

[56] References Cited

U.S. PATENT DOCUMENTS

| | | | |
|---|---|---|---|
| 3,299,901 | 1/1967 | Axe et al. | 134/123 |
| 3,533,422 | 10/1970 | Alimanestiano | 134/45 |
| 3,559,659 | 2/1971 | Gougoulas | 134/45 |
| 3,570,502 | 3/1971 | Farnsworth et al. | 134/123 X |
| 3,575,184 | 4/1971 | Jurkens | 134/45 |
| 3,939,517 | 2/1976 | Bivens | 15/DIG. 2 |
| 4,562,848 | 1/1986 | Messing et al. | 134/123 |
| 4,718,439 | 1/1988 | Gorra et al. | 134/123 X |

FOREIGN PATENT DOCUMENTS 241569 8/1960 Australia .............................. 134/123

*Primary Examiner*—Philip R. Coe
*Attorney, Agent, or Firm*—Klarquist, Sparkman, Campbell, Leigh & Whinston

[57] ABSTRACT

An applicator is supported by primary and secondary arms for movement along the contour of the front, top and rear surfaces of a vehicle. The applicator is shifted to a position out of the path of vehicle travel in the event of electrical power or pressure fluid failure. A sensory mechanism controls actuators which position the primary and secondary arms. From a lower rest position, the primary arm is raised to progressively position the applicator above the hood and roof areas of the vehicle. The primary arm is then dropped to its rest position while the secondary arm is raised and knuckled toward the primary arm to maintain the applicator above the vehicle roof. The secondary arm is extended as the vehicle passes.

13 Claims, 3 Drawing Sheets

FRONT, TOP AND REAR APPLICATOR FOR A VEHICLE WASH

BACKGROUND OF THE INVENTION

1. Field of the Invention

This invention concerns improvements in applicator for applying cleaning fluid to exterior surfaces of a vehicle.

2. General Discussion of the Background

In a typical automatic vehicle wash installation, a vehicle is transported on a moving conveyor past various cleaning brushes, liquid applicators, dryers and other cleaning devices. Many of these devices are reciprocated towards and away from the vehicle and into and out of the path of vehicle travel by hydraulic or pneumatic cylinders as the vehicle moves through the installation. If fluid or electrical power is interrupted, the heavy cleaning devices can fall onto the vehicle or remain in the vehicle path where they are struck, causing damage to the vehicle.

This problem is illustrated by U.S. Pat. No. 3,410,284, in which a horizontally oriented liquid applicator is suspended from above by a pair of pressure cylinders. The cylinders selectively adjust the height of the applicator to maintain it at a somewhat constant distance above the changing contours of an automobile passing below the applicator. An interruption in the supply of electricity or pressure fluid to the cylinders would immobilize the applicator. If this happens when the applicator is in one of its lowered positions in the path of the advancing vehicle, the vehicle could strike the applicator and be damaged.

Another problem in prior vehicle washes is the difficulty of maintaining a liquid applicator at a substantially constant distance from the surface of a vehicle being cleaned, to assure evenness of liquid application and cleaning. This problem is compounded by the wide variations in the contours of hoods, windshields, roofs and other vehicles surfaces. In the past, electric eyes on the cleaning element have been used to control the movement of the cleaning element in response to these changing contours. U.S. Pat. No. 3,410,284, for example, has electric eyes on the cleaning element for controlling pressure cylinders to raise and lower the cleaning element to clear vehicles passing the cleaning element. However, the applicator in this patent is not understood to have the capability of cleaning front grill and rear bumper areas of a vehicle.

Another problem with prior automated vehicle washes is unique to liquid-applicator type washers in which a cleaning liquid is directed under pressure from a cleaning element toward a vehicle which is being moved past the cleaning element. If liquid is projected vertically downwardly from the applicator, the upright front grill and rear end of the vehicle will not be satisfactorily cleaned. On the other hand, if liquid spray is angled in a fixed direction toward the upright grill of an advancing car, the downwardly inclined rear window area of the car and the upright tail end of the car will not be adequately cleaned. To enhance uniform cleaning, the liquid applicator must apply cleaning liquid to all of these surfaces.

It is one object of this invention to provide a cleaning apparatus for an automated vehicle wash which will not damage an automobile if electrical power or pressure fluid supplied to the apparatus is interrupted.

Another object of this invention is to provide a cleaning apparatus which maintains a cleaning element at a substantially uniform distance from the changing contours of the front, top and rear surfaces of a vehicle.

It is another object of the invention to provide a front, top and rear liquid applicator for a vehicle wash which applies liquid to the changing contours of a vehicle in such a way that cleaning efficiency is enhanced.

These and other objects of the invention will be evident to those skilled in the art from the following detailed description.

SUMMARY OF THE INVENTION

The foregoing objects are achieved by a vehicle washing apparatus which cleans the front, top and rear surfaces of a vehicle as the vehicle moves relative to the washing apparatus. The washing apparatus includes a cleaning element which is shifted between lower positions, in the path of travel of a vehicle, and an upper position, which is above the path of vehicle travel. The cleaning element is biased to the upper position. Therefore, in the event of electrical power or pressure fluid failure, the cleaning element automatically shifts to this upper position to clear any vehicles travelling past the cleaning element. During normal operation of the apparatus, the cleaning element is moved against this bias to adjust the position of the cleaning element and hold it at a substantially constant distance from the changing contours of the front, top and rear surfaces of a passing vehicle.

In preferred embodiments, the cleaning element is carried by a pivotal mounting structure, which includes an upper primary arm and a lower secondary arm. The primary arm is pivotally mounted at one end portion to a frame support for movement about a horizontal axis, while the secondary arm is pivotally mounted to the distal end portion of the primary arm for movement about another horizontal axis. Each of the primary and secondary arms carry a counterweight which biases them to a position which shifts the cleaning element out of the path of vehicle travel. Each of the primary and secondary arms is moved against the bias of its associated counterweight by a respective fluid actuated cylinder. The cylinders are each independently controlled by a sensing mechanism so as to adjust the positions of the primary and secondary arms and shift the cleaning element to follow the contours of the front, top and rear surfaces of a vehicle.

In the illustrated embodiment, liquid under pressure is sprayed from the cleaning element toward the surfaces of the vehicle being cleaned. Liquid is directed from a first set of nozzles of the cleaning element to the front, hood, windshield and roof portions of the vehicle. Liquid is also directed from a second set of nozzles of the cleaning element to the roof, rear window, trunk and rear bumper portions of the vehicle. A sensing mechanism controls the flow of liquid to the sets of nozzles so as to always direct cleaning fluid toward the surfaces of the vehicle being cleaned.

DETAILED DESCRIPTION OF PREFERRED EMBODIMENTS

Figure 3:
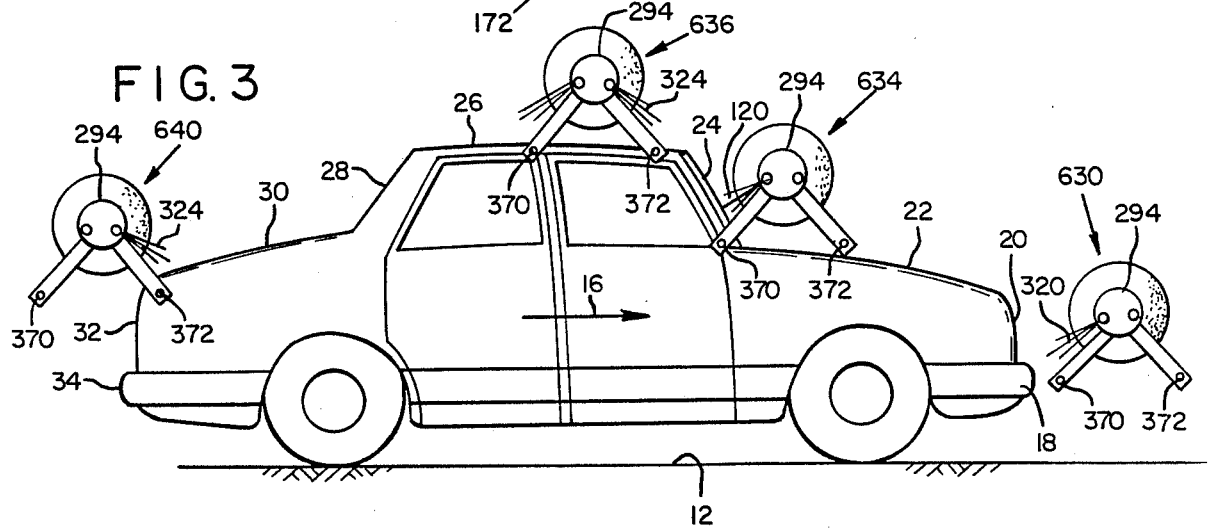
FIG. 3 is a schematic side elevational view of the cleaning element of the apparatus of FIG. 1 in various positions relative to an automobile which is travelling past the cleaning element.
Figure 2:
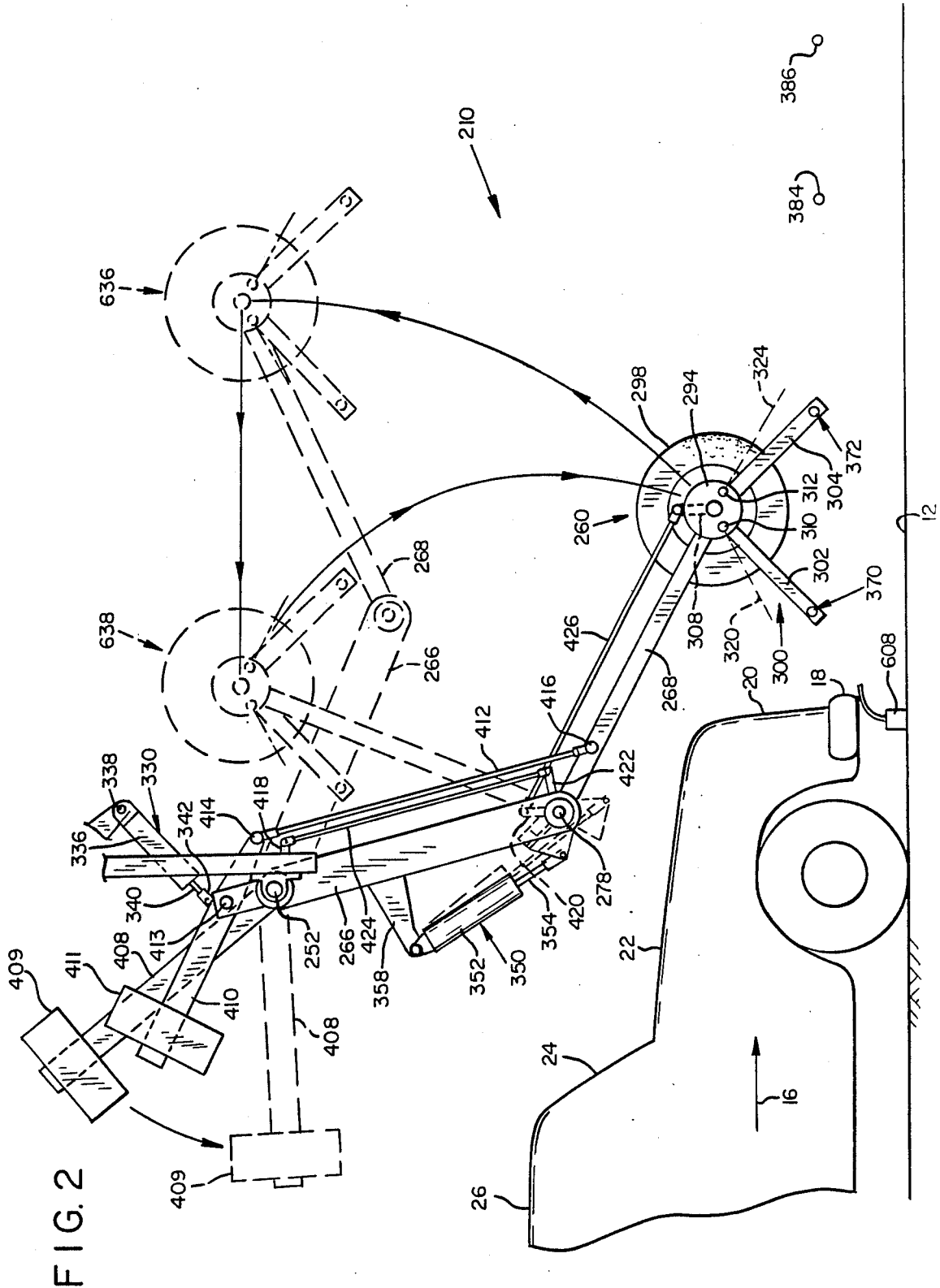
FIG. 2 is a side elevational view of a second embodiment of the apparatus of the invention which shows selected alternate positions of the primary and secondary arms of the apparatus in dashed lines.

In one illustrated embodiment, a washing apparatus 10 is installed in an automated vehicle wash installation which includes a conventional conveyor 12 (FIG. 2) for transporting a vehicle 14 along a path of travel or movement, in the direction of arrow 16. As shown in FIG. 2, a typical vehicle 14 includes a front bumper 18, an upright grill portion 20, a front hood 22, an upwardly and rearwardly inclined windshield 24, and a roof 26. Referring to FIG. 3, the vehicle also has a downwardly and rearwardly inclined rear window 28, trunk surface 30, upright tail portion 32, and a rear bumper 34.

Washing apparatus 10 includes first and second upright floor mounted frame members 40, 42 (FIG. 1), one on each side of conveyor 12. Uprights 40, 42 are spaced a sufficient distance apart to allow vehicle 14 to pass between them. A bracket 44 mounts a pivot stub shaft 46 to upright 40 for rotation about a horizontal pivot axis. The inner end of stub shaft 46 has an enlarged annular primary arm supporting flange 48 for purposes explained below. A similar bracket 50 pivotally mounts a pivot stub shaft 52 to upright 42 for rotation about the horizontal pivot axis. The inner end of stub shaft 52 also has an enlarged annular flange 54, which opposes flange 48.

A cleaning member 60 is carried by a pair of parallel pivotal elongated supports 62a, 62b which move member 60 between lowered positions in which member 60 is in the path of travel of vehicle 14, and raised positions above and out of the path of travel. Support 62a includes an upper elongated primary arm 66a mounted at one end portion to flange 48. Thus, primary arm 66a is pivoted to frame member 40 by stub shaft 46. Support 62a also has an elongated lower secondary arm 68a, which is pivoted by a pivot 78a to the distal end portion of primary arm 66a. Pivot 78a is intermediate the ends of secondary arm 78a. Secondary arm 66a includes a downwardly turned or angled free end portion 70a which terminates in a bracket 72a. Bracket 72a is clamped to cleaning member 60. Secondary arm 66a also includes a lever portion comprised of a pair of parallel opposing plates 74a, 76a extending rearwardly of pivot 78a. Support 62b is similar to support 62a, and like parts have been given like reference numerals, except that the numerals for support 62b are designated "b", instead of "a".

A horizontal reinforcing shaft 84 extends between supports 62a, 62b in axial alignment with stub shafts 46, 52. Shaft 84 has flanges 86a, 86b at each end thereof which are respectively secured to the primary arms 66a, 66b and flanges 48, 54. Shaft 84 rigidifies the construction and maintains the spacing between the arms.

A counterweight 90a, comprised of weighted sections 92a and 94a, is secured to an upper end of primary arm 66a. A counterweight 90b, which includes counterweight members 92b and 94b, is fastened to the upper end of primary arm 66b. A similar counterweight 95a is carried by secondary arm 68a between plates 74a, 76a. Likewise, secondary arm 68b has a counterweight 95b. These counterweights comprise one form of means for biasing the supports 62a, 62b to a position which lifts the element 60 out of the path of travel of the vehicle 14. In the event of electrical power failure or pressure failure, element 60 is automatically shifted out of the vehicle travel path by this biasing mechanism.

Figure 1:
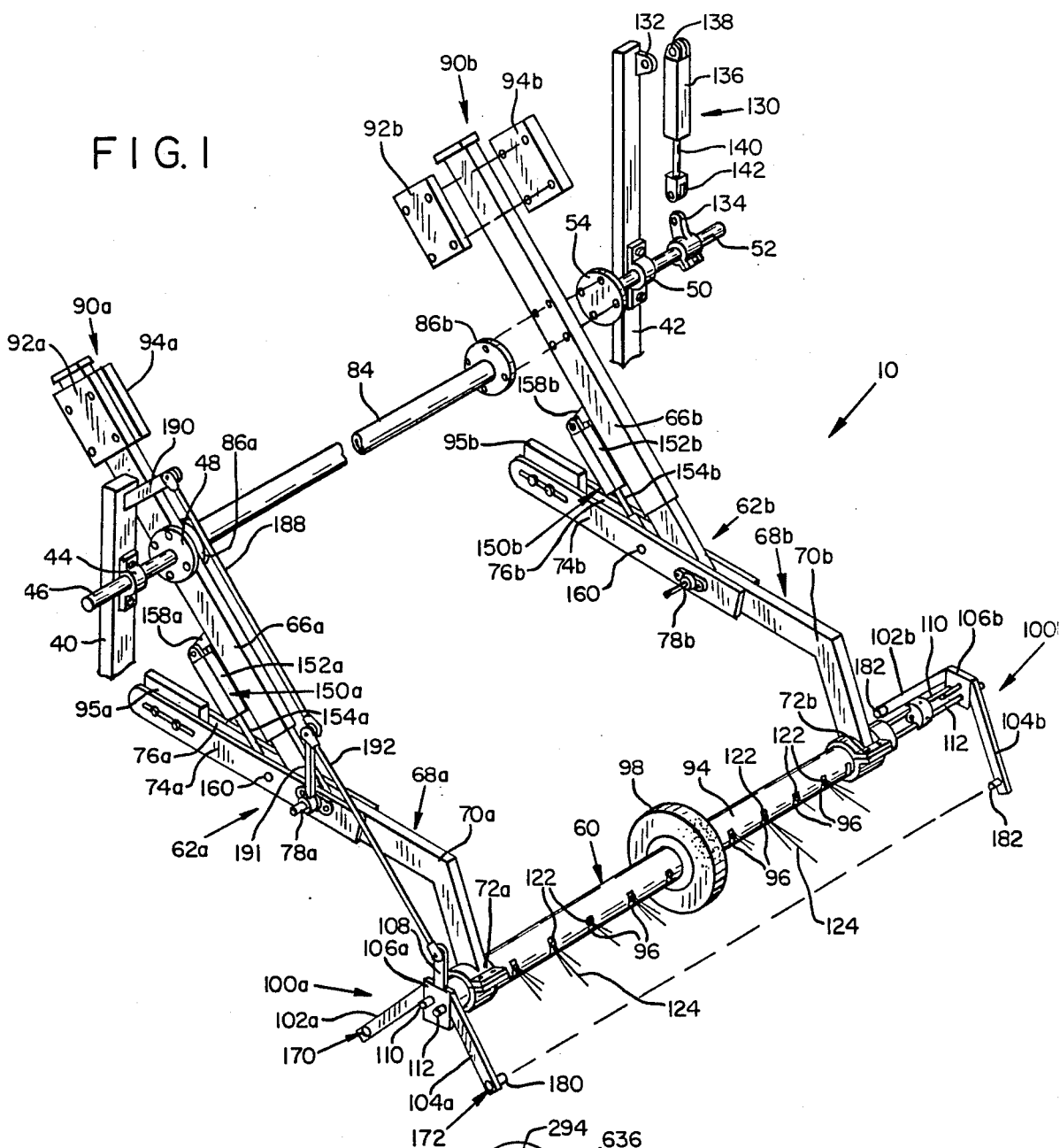
FIG. 1 is a fragmentary, partially exploded, perspective view of a first embodiment of a vehicle washing apparatus of the present invention.

The illustrated form of cleaning element 60 comprises a fabric-covered tube 94 supported between secondary arms 68a, 68b by the brackets 72a, 72b. A series of spaced apart arcuate slots 96 extend through the side wall of tube 94 at one side of the tube (FIG. 1). Similar slots, not shown, are provided at the other side of the tube. Liquid, steam, or other fluid is sprayed from nozzles through these slots as explained below. A rotatable fabric ring 98 projects outwardly from the center of tube 94. This ring, together with fabric on tube 94, cushions any accidental impact between the vehicle and the cleaning element.

A pair of inverted V-shaped brackets 100a, 100b are pivotally carried by tube 94 at opposite ends of the tube. Bracket 100a includes a first leg 102a extending downwardly and rearwardly of tube 94 and a second leg 104a extending downwardly and forwardly of the tube. Legs 102a, 104a are joined at their upper ends by a plate 106a. An ear 108 projects upwardly from plate 106a for purposes explained below. Bracket 100b similarly comprises a pair of depending legs 102b. 104b joined at their common vertex by a plate 106b.

A pair of parallel, rigid manifolds 110, 112 extend through tube 94 and plates 106a, 106b. The respective ends of these manifolds 110, 112 are mounted to plates 106a, 106b and extend outwardly beyond plate 106b for coupling to respective liquid supply lines. Each manifold 110, 112 is provided with a series or set of nozzles, one set being indicated at 122 in FIG. 1, along its length for spraying water or other pressurized cleaning fluid onto vehicle 14. The nozzles of manifold 110 are positioned to spray pressurized fluid, through associated slots in tube 94, rearwardly and downwardly. The nozzles 122 of manifold 112 are similarly positioned to spray pressurized fluid 124 (FIG. 1) forwardly and downwardly through slots 96. The forward and rearward sprays are each directed at an angle of about forty-five degrees below a horizontal reference plane. Since manifolds 110, 112 are carried by plates 106a, 106b, the manifolds and their associated nozzles rotate as plates 106a, 106b pivot. This allows the orientation of nozzles 122 to remain constant during operation of the apparatus. The arcuate shape of slots 96 allows passage of the spray even as the manifolds pivot relative to tube 94.

A first fluid-actuated piston and cylinder assembly 130 is mounted between a bracket 132 on frame member 42 and a bracket 134 fixed to shaft 52. Assembly 130 includes a cylinder 136 with an ear 138 pivoted to bracket 132. The assembly 130 also has a piston with a rod 140 having a clevis 142 pivoted to an ear which projects from bracket 134. Extension and retraction of piston rod 140 turns shaft 52 and raises and lowers primary arms 66a, 66b.

A pair of fluid-actuated piston and cylinder assemblies 150a, 150b are provided to pivot the secondary arms relative to the primary arms and to in effect knuckle and extend the secondary arms relative to the primary arms. Assembly 150a includes a cylinder 152a with an associated ear pivoted to a flange 158a on the underside of primary arm 66a. The assembly 150a also has a piston rod 154a pivoted to the secondary arm 68a at 160. Assembly 150 has similar components indicated with the notation "b". Extension and retraction of piston rods 154a, 154b raises and lowers secondary arms 68a, 68b.

A sensing mechanism is carried by washing element 60 for sensing the height of the portion of vehicle 14 being cleaned. This sensing mechanism controls cylinder assemblies 130, 150a and 150b to pivot the primary and secondary arms to adjust the position of cleaning member 60 with respect to the front, top and rear surfaces of vehicle 14. The illustrated sensing mechanism includes first and second electric eye sensors 170, 172. Each of the sensors includes a radiation emitter, such as a light source 180, and receiver 182. The source 180 and receiver 182 of first sensor 170 are mounted in opposing relationship on legs 102a, 102b of brackets 100a, 100b such that sensor 170 is positioned rearwardly and downwardly of tube 94. The electric eye 180 and receiver 182 of sensor 172 are similarly mounted in opposing relationship on legs 104a, 104b of brackets 100a, 100b.

The sensing mechanism also typically includes a third sensor 384, which in the illustrated embodiment is positioned about three and one-half feet in front of tube 94. In addition, the sensing mechanism includes a fourth sensor 386 about five feet in front of sensor 384 (FIG. 2). The sensors 384, 386 each have a transmitter and receiver positioned in opposing relationship on either side of the conveyor 12. Sensors 384, 386 are mounted on supports, not shown. Typically, sensor 386 is eliminated unless vehicles are to be washed very closely after one another in the vehicle wash.

Sensors 170, 172 sense the height of vehicle 14 as the vehicle is being cleaned by apparatus 10. To properly perform this function, transmitters 180 and receivers 182 of sensors 170, 172 are typically positioned in a common horizontal plane. An orienting means is provided to maintain sensors 170, 172 in this horizontal plane as the primary and secondary arms pivot. One form of orienting means includes a rod 188 (FIG. 1) pivotally connected at one end to a stationary flange 190 projecting from upright 40. The rod 188 is pivotally connected at its opposite end to a projecting link 191, which is pivotally mounted to, and extends upwardly from, pivot 78a. A second rod 192 is pivotally attached to link 191 and also to ear 108. Rods 188, 192 maintain brackets 100a, and thus bracket 100a via manifolds 110, 112, the sensors 170, 172, and manifolds 110, 112, in the same orientation even as the primary and secondary arms move. In addition, nozzles 122 move in unison with brackets 100a, 100b so that the spray does not change directions, as arms 66, 68 are pivotally raised and lowered. The slots 96 accommodate a wide arc of relative movement between the nozzles and tube 94.

Second Pivot Arm Embodiment

A second embodiment of the apparatus 10 is shown in FIG. 2, wherein similar parts have been given like reference numerals to those in FIG. 1, incremented by 200. In this embodiment, tube 294 (washing member 260) is raised and lowered by a single primary arm 266 and secondary arm 268 support structure attached to one end of tube 294. That is, in this form of invention, member 260 is cantilevered from the secondary arm. A primary arm extension 408 carries a primary arm counterweight 409, which is operable like counterweights 90a and 90b in FIG. 1 to bias the assembly to an up position. Secondary arm 268 is straight and is pivotally connected at one end to primary arm 266 by pivot pin 278. The secondary arm is biased as follows. A counterweight arm 410 is pivotally connected at 413 to the upper end of primary arm 266. Also, a secondary arm counterweight 411 is carried by the free end of counterweight arm 410. An extension rod 412 is pivotally connected at 414, 416 to arms 410, 268, respectively, to transmit the counterweight force from counterweight 409 to secondary arm 268.

Primary arm 266 is raised and lowered by cylinder assembly 330, which operates like assembly 130 in FIG. 1. Secondary arm 268 is raised and lowered by cylinder assembly 350, which operates like assembly 150 in FIG. 1.

The FIG. 2 embodiment also has an orienting means for maintaining sensors 370, 372 (on legs 302, 304 of V-shaped bracket 300) in a horizontal plane. This means prevents a change in the direction of the spray 320, 324 from nozzles of the apparatus. The illustrated form of orienting means includes a stationary flange 418 projecting from the apparatus supporting frame. An L-shaped member with legs 420, 422 is pivotally mounted to pin 278. In addition, an ear 308 is fixed to bracket 300. Also, a first rod 424 is pivotally connected at one end to projection 418 and at its other end to leg 422. Finally, a second rod 426 is pivotally connected at one end to leg 420 and at its other end to ear 308. As the primary and secondary arms move, rods 412, 426 pivot a plate (not shown) to thereby pivot legs 302, 304 and manifolds 310, 312. This maintains the nozzles and sensors in the desired orientation.

Pneumatic and Electrical Circuits

Figure 4:
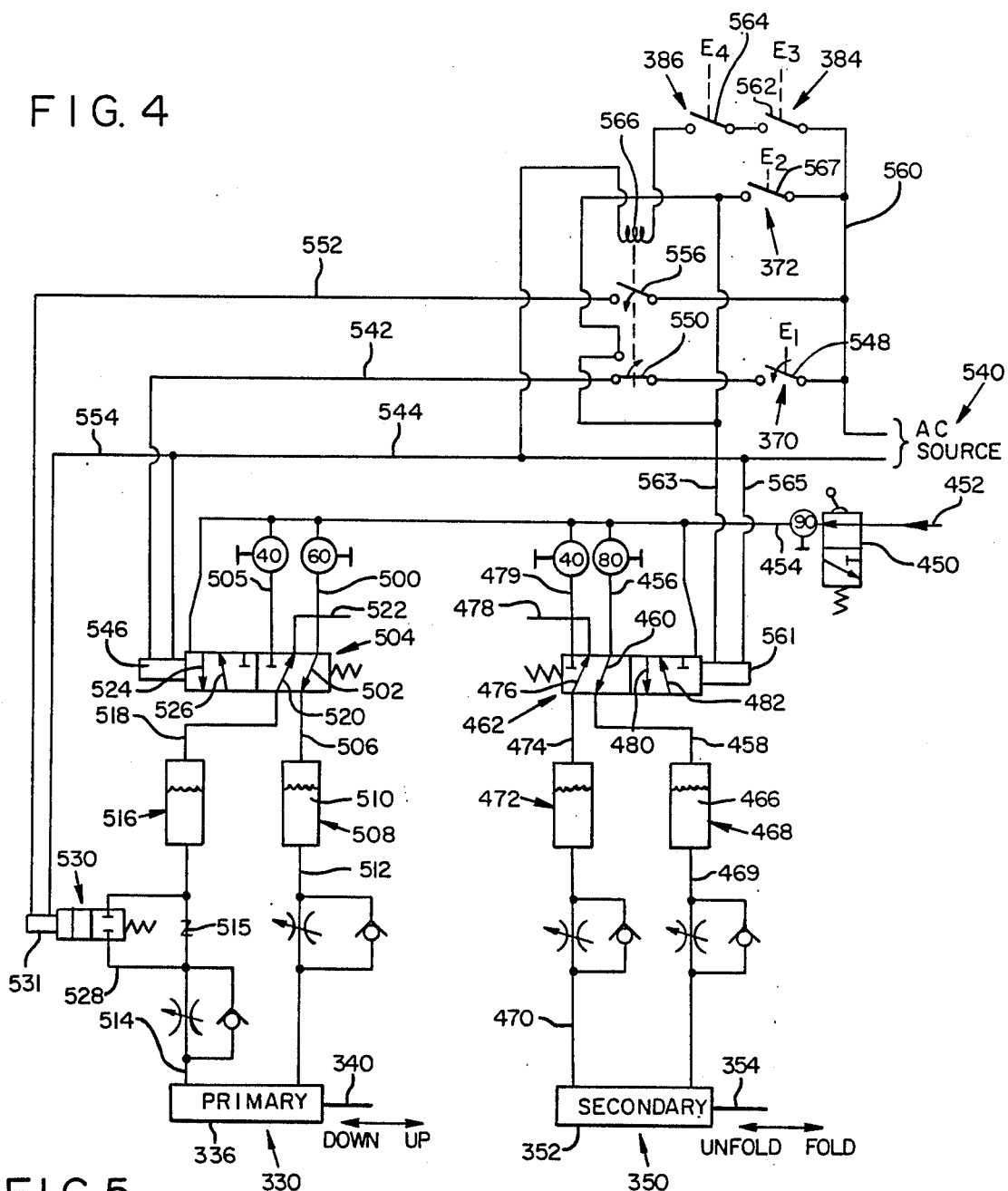
FIG. 4 is a schematic view of the electrical and pneumatic circuits of the apparatus of FIG. 1.

FIG. 4 is a schematic drawing of an illustrated embodiment of electrical and pneumatic circuits used to actuate primary arm piston and cylinder assembly 330 and secondary arm assembly 350 in FIG. 2. The same electrical and pneumatic circuits are also suitable for the embodiment of FIG. 1.

In FIG. 4, the circuits are shown in their initial or rest position, with primary and secondary arms 266, 268 in their fully extended positions, shown in solid lines in FIG. 2. To maintain arms 266, 268 in their fully extended positions against the bias of counterweights 409, 411, valve 450 is shifted to its flow through position to introduce air at 100 psi from source 452 into a line 454. Air from line 454 flows, at a reduced pressure of 80 psi, through a line 456, which communicates with line 458 through passageway 460 in a solenoid controlled spring biased valve 462. The pressure in line 458 acts on oil 466 in oil pot 468 to move it through line 469 and keep piston rod 354 of assembly 350 in its retracted position. Return line 470, from assembly 350, communicates with an oil pot 472, which in turn communicates with line 474, a passageway 476 in valve 462, and a vent 478. Valve 462 is shifted automatically to this position in the event of an electrical power failure or a loss of air pressure. Passageways 480, 482 are also provided through valve 462. Also, a fluid line 479 connects valve 462 to line 454.

Air from line 454 also flows through a line 500 at eighty psi, a passageway 502 of a spring biased solenoid controlled valve 504, and through a line 506 to an oil pot 508. The pressure applied to oil pot 508 forces oil 510 through line 512 into assembly 330 and maintains piston rod 340 in its fully retracted position. A return line 514 is connected from cylinder 336 through a parallel combination of a flow restrictor and check valve, and another check valve 515, to an oil pot 516. Oil pot 516 in turn communicates with a line 518, a passageway 520 in valve 504, and a vent 522. Passageways 524, 526 are also provided through valve 504. A line 505 connects valve 504 to the line 454.

A bleed line passageway 528 is selectively closed by a solenoid controlled valve 530 to bypass check valve 515 and bleed oil from assembly 330 and lower the primary arm as explained below.

A source of AC power 540 has its common wire connected to the solenoids of each of the valves 462, 504, 530 and to one side of a relay coil 566. The other wire 560 of source 540 is coupled through electric eye controlled switch 548 and a relay controlled switch 550 to the solenoid of valve 504. In addition, the wire 560 is coupled through a relay controlled switch 556 to the solenoid of valve 530. Moreover, wire 560 is coupled through electric eye controlled switches 562, 564 to coil 566. Finally, wire 560 is coupled through an electric eye controlled switch 567 to the solenoid of valve 462 and also from switch 567 to a terminal of switch 550 and from this terminal to the solenoid of valve 462. The electric eyes (FIG. 2) which control the respective switches 548, 567, 562 and 564 are identified in FIG. 4. The operation of this control circuit is explained below.

Figure 5:
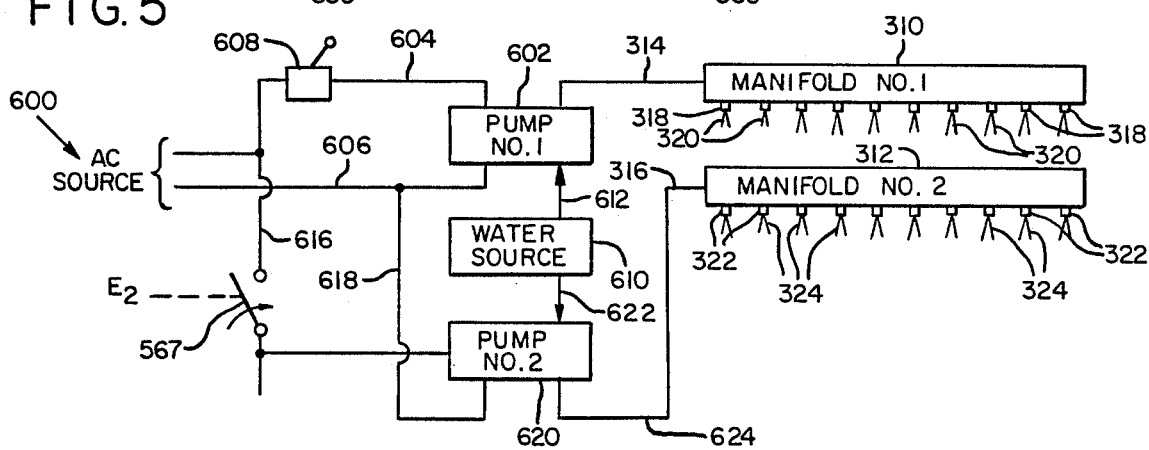
FIG. 5 is a schematic view of the electrical circuit and liquid supply lines for providing pressurized fluid to the cleaning element.

Referring to FIG. 5, manifolds 310, 312, which are carried within tube 294, are selectively supplied with liquid which is sprayed onto vehicle 14. A rearwardly directed spray 320 is obtained from manifold 310 and a forwardly directed spray 324 is obtained from manifold 312. FIG. 5 illustrates the manner in which liquid is selectively supplied to the respective manifolds.

An AC source 600 has its common wire 606 connected to a pump 602 and its other wire 616 connected through a limit switch 608 (FIGS. 2 and 5) to pump 602. Switch 608 closes this circuit and starts pump 602 when bumper 18 of vehicle 14 hits the switch. Pump 602 then pumps water or other liquid through a line 612 from a source 610 and through a line 314 to manifold 310. Liquid reaching manifold 310 is sprayed by nozzles 318 onto vehicle 14 as indicated at 320. The AC source wire 606 is also connected to a pump 620 and wire 616 is coupled through an electric eye controlled switch 567 to the pump. When switch 567 closes, at times when the beam to electric eye 372 is broken, pump 620 operates to pump liquid through a line 622 from source 610, through a line 624, and to manifold 312. Liquid reaching manifold 312 is sprayed by nozzles 322 onto vehicle 14 as indicated at 324.

Operation

At the entrance to the automated car wash, vehicle 14 is placed front end first on conveyor 12, which moves vehicle 14 along a path in the direction indicated by arrow 16 (FIG. 3). As vehicle 14 approaches apparatus 10, front bumper 18 hits and closes switch 608 (FIGS. 2 and 5) on the floor of the car wash. When switch 608 is closed, pump 602 is activated to pump liquid to manifold 310, which initiates the spray 320 (FIGS. 3 and 5) through nozzles 318 toward the front bumper 18 and grill 20 of vehicle 14. At this time, primary arm 266 is in its lowest position while secondary arm is in its fully extended position, as shown in FIG. 2. This places tube 294 in the position indicated at 630 in FIG. 3.

As vehicle 14 continues to move forward on conveyor 12, the beam of light from sensor 370 is interrupted and contact 548 (FIG. 4) closes. As a result, solenoid 546 is energized to shift the position of valve 504 from its first position shown in FIG. 4 to a second position. In the second position, line 505 is connected to line 518 through passageway 524 and line 506 is connected to vent line 522 through passageway 526. Pressurized air then forces oil in pot 516 through check valve 515 and another check valve to cylinder 336. This extends piston rod 340 and lifts primary arm 268. Once sensor 370 is raised above the level of hood 22, the beam of this sensor is no longer broken. Contact 548 then opens and valve 504 moves back to its first position shown in FIG. 4. Primary arm 266 remains in place because oil that has been introduced into cylinder 336 has no escape path.

Vehicle 14 continues to progress in direction 16 until the beam of sensor 370 is once again broken, typically by encountering the upwardly sloped surface of hood 22 or upwardly sloping windshield 24. The position of tube 294 at the time sensor 370 is interrupted by windshield 24 is shown at 632 in FIG. 3. When the beam of sensor 370 is again interrupted, contact 548 once again closes and energizes solenoid 546. The valve 504 is shifted so that primary arm 266 and tube 294 again raise until the beam of sensor 370 is no longer broken. Cleaning element 118 is then in a position to move over the roof 26 of vehicle 14.

As vehicle 14 continues to travel in direction 16, the beams of both sensors 384 and 386 (FIG. 2) will eventually be broken. As arm 266 lowers, the beams of sensors 370, 372 are broken and contacts 548 and 567 close. When switch 567 closes, pump 620 (FIG. 5) is activated and begins pumping liquid to manifold 312 and out of nozzles 322 in a forward and downward direction. This closes switches 562, 564 (FIG. 4) and energizes relay coil 566. Relay controlled contact 556 then closes, while contact 550 is opened. Valve 530 shifts to its bypass position and valve 504 shifts to its initial position. When this happens, primary arm 266 lowers to its rest position. The closing of contact 567 also energizes solenoid 561 to move valve 462 from its first position shown in FIG. 4 to a second position. In the second position, line 479 is connected to line 474 through valve passageway 480 and line 458 is connected to vent line 478. Pressurized air then flows through line 474 into oil pot 472, causing piston rod 354 to extend. This knuckles secondary arm 268 toward the primary arm and raises this arm. As this is taking place, applicator 294 is in the position shown at 636 in FIG. 3.

Secondary arm 268 is lifted or knuckles until the beams of sensors 370, 372 are no longer interrupted, and tube 294 is positioned above roof 26 as shown at 638 in FIG. 2. When the beams of sensors 370, 372 are no longer interrupted, contact 567 opens. This prevents piston rod 354 from extending further.

As vehicle 14 continues to travel in direction 16, sensors 370, 372 move beyond rear window 28, whereupon only the beams of sensors 384 and 386 will be interrupted. Piston 354 will then retract, which lowers secondary arm 268 downwardly along the contour of rear window 28. By this time vehicle 14 will have moved in direction 16 beyond sensor 384, valve 530 shifts to the position shown in FIG. 4. Eventually, only sensor 372 is interrupted, as shown at 640 in FIG. 3. When this happens, contact 567 is closed, but contacts 548, 562, 564 are open. Secondary arm 268 then lowers to spray tail surface 32 and rear bumper 34.

Having illustrated and described the principles of my invention with reference to several preferred embodiments, it should be apparent to those persons skilled in the art that such invention may be modified in arrangement and detail without departing from the principles thereof. For example, other arrangements, dimensions and spacing of washing materials will be suitable. I claim as my invention all such modifications as come within the true spirit and scope of the following claims.

I claim:

1. A vehicle washing apparatus for cleaning an exterior surface of a vehicle as the vehicle moves along a travel path of movement, said apparatus comprising:
a cleaning element for cleaning said surface of said vehicle, said cleaning element being movable between a lower position in said path of movement and an upper position above said path of movement;
biasing means for biasing said cleaning element to said upper position;
power-operated cleaning element positioning means for moving said cleaning element independent of the bias of said biasing means toward and away form said surface;
at least one pivotal suspension member for supporting said cleaning element and moving said cleaning element between said lower and upper positions; and
a frame support to which said suspension member is mounted, said suspension member comprising a primary arm and a secondary arm, said primary arm being pivotally mounted to said support, said secondary arm being pivotally mounted to said primary arm, said cleaning element being mounted to said secondary arm for movement toward and away from said surface;
said biasing means being operable to move said cleaning element to a position above said path in the absence of power to said positioning means.

2. A vehicle washing apparatus for cleaning an exterior surface of a vehicle as the vehicle moves along a travel path of movement, said apparatus comprising:
a cleaning element for cleaning said surface of said vehicle, said cleaning element being movable between a lower position in said path of movement and an upper position above said path of movement;
biasing means for biasing said cleaning element to said upper positions;
cleaning element positioning means for moving said cleaning element independent of the bias of said biasing means toward and away from said surface;
at least one pivotal suspension member for supporting said cleaning element and moving said cleaning element between said lower and upper position;
a frame support to which said suspension member is mounted, said suspension member comprising a primary arm and a secondary arm, said primary arm being pivotally mounted to said support for movement in a generally vertical plane, said secondary arm being pivotally mounted to said primary arm for movement in a generally vertical plane, said cleaning element being mounted to said secondary arm for movement toward and away from said surface;
said cleaning element positioning means comprising a first positioning means for pivoting said primary arm relative to said support in the generally vertical plane of movement of the primary art and a second positioning means for pivoting said secondary arm relative to said primary arm in the generally vertical plane of movement of the secondary arm.

3. The apparatus of claim 1 further comprising sensing means for sensing without physical contact the height of said vehicle and for controlling the first and second positioning means to adjust the position of said cleaning element with respect to said surface of said vehicle.

4. The apparatus of claim 3 wherein said sensing means comprises plural electric eye sensing means carried by said cleaning element.

5. The apparatus of claim 4 wherein said sensing means comprises a first sensor means positioned rearwardly and downwardly of said cleaning element and a second sensor means positioned forwardly and downwardly of said cleaning element.

6. The apparatus of claim 5 wherein said first and second sensor means are in a reference plane, said apparatus further comprising sensor orienting means for maintaining said sensor means in said reference plane.

7. The apparatus of claim 1 wherein said secondary arm comprises a pivot attachment portion which is pivotally attached to said primary arm, and a cleaning element supporting portion which is inclined downwardly at an angle to said pivot attachment portion.

8. The apparatus of claim 1 further comprising a fabric disc rotatably secured to said cleaning element and extending outwardly therefrom.

9. The apparatus of claim 8 further comprising a fabric covering which substantially completely covers said cleaning element.

10. The apparatus of claim 1 wherein said cleaning element comprises pressurized fluid applicator means for selectively directing a flow of pressurized fluid forwardly and rearwardly from said cleaning element.

11. The apparatus of claim 10 wherein said cleaning element further comprises a first manifold with a plurality of nozzles for selectively directing a flow of pressurized fluid in a first direction rearwardly and downwardly of said cleaning element, and a second manifold with a plurality of nozzles for selectively directing a flow of pressurized fluid in a second direction downwardly and forwardly of said cleaning element, said apparatus further comprising nozzle orienting means for maintaining said nozzles of said first manifold pointed in said first direction and said nozzles of said second manifold pointed in said second direction.

12. The apparatus of claim 1 wherein said cleaning element includes a nozzle for spraying liquid on said surface and the apparatus includes linkage means responsive to movement of the primary and secondary arms for maintaining said nozzle at a constant orientation relative to a horizontal plane as said cleaning element moves.

13. A vehicle washing apparatus for cleaning an exterior surface of a vehicle as the vehicle moves along the travel path of movement, said apparatus comprising:
a support frame;
a primary suspension arm pivotally mounted to said frame;
a secondary suspension arm pivotally mounted to said first arm;
a cleaning element including a nozzle therein and mounted to said secondary arm for cleaning said surface of said vehicle, said cleaning element being movable between a lower position in said path of movement and an upper position above said path of movement;

sensing means mounted to said cleaning element for sensing the height of said vehicle;

cleaning element positioning means responsive to said sensing means for moving said cleaning element toward and away from said vehicle surface, said cleaning element positioning means being adapted to pivot said primary arm relative to said support frame and for pivoting said secondary arm relative to said primary arm; and linkage means responsive to movement of the primary and secondary arms for maintaining said nozzle of said cleaning element at a constant orientation relative to a horizontal plane as said cleaning element moves.

* * * * *